Aug. 26, 1969          J. E. MYERS          3,463,224
                    THERMAL HEAT SWITCH
Filed Oct. 24, 1966                        2 Sheets-Sheet 1

John E. Myers,
INVENTOR.

BY

Donald W. Graves

ATTORNEY.

John E. Myers,
INVENTOR.

United States Patent Office 3,463,224
Patented Aug. 26, 1969

3,463,224
THERMAL HEAT SWITCH
John Edmond Myers, Culver City, Calif., assignor to TRW Inc., Redondo Beach, Calif., a corporation of Ohio
Filed Oct. 24, 1966, Ser. No. 589,056
Int. Cl. G05d 23/00; F28f 27/00, 7/00
U.S. Cl. 165—32                                      3 Claims

ABSTRACT OF THE DISCLOSURE

A heat transfer switch is provided which utilizes an expandable liquid in a container which when heated will expand to force one heat transfer element into heat transfer contact with another element. The device is temperature sensitive in that below a very narrow range of temperature, little heat transfer is accomplished while in and above this narrow range of temperature a great deal of heat is transferred. In addition, override springs are provided to prevent damage to the switch and to insure a gap between the heat transfer elements when it is not desirable to transfer heat.

---

Man-made space vehicles typically produce heat which is dissipated by radiation from the skin of the vehicle. It is often desirable to maintain the interior or selected portions thereof at a predetermined temperature. If the temperature is below the desired level, then insulation should be provided to prevent dissipation of heat to the vehicle skin. If the temperature level rises above the desired temperature, then heat should be conducted to the skin and thus dissipated by radiation to a heat sink. An example of a thermal heat switch for space vehicle applications is described and claimed in copending patent application Ser. No. 569,708, filed Aug. 2, 1966, and assigned to the assignee of this invention. In that patent application there is described a heat switch using flat plates with spheres therebetween. A sensing and actuation device is provided to control contact between the plates, and thereby the heat transfer.

There are many examples in the prior art of heat transfer switches which typically comprise bimetallic elements. Examples of these are seen in U.S. Patent No. 1,703,803 and No. 2,451,903. Other examples include U.S. Patent No. 2,949,283, and No. 3,177,933.

The U.S. patent to Josephsen et al., No. 1,796,907, is an example of an expanding liquid switch which controls a valve of a heat exchanger. In the U.S. patent to Wild, No. 2,363,375, a liquid is enclosed in a container. When the liquid is heated, it will expand so as to contact a heat transfer element and dissipate heat. In this device, the liquid must be a good heat conductor.

Briefly, this invention comprises a heat transfer switch which utilizes an expandable liquid in a container which, when heated, will expand to force one heat transfer element into a heat transfer contact with another element. The first element, when in contact with the second element, will conduct heat from a heat source to a heat sink. As an adjunct to this structure, override springs are provided to prevent damage to the switch and to insure a gap between the heat transfer elements when it is not desirable to transfer heat.

Figure 1:
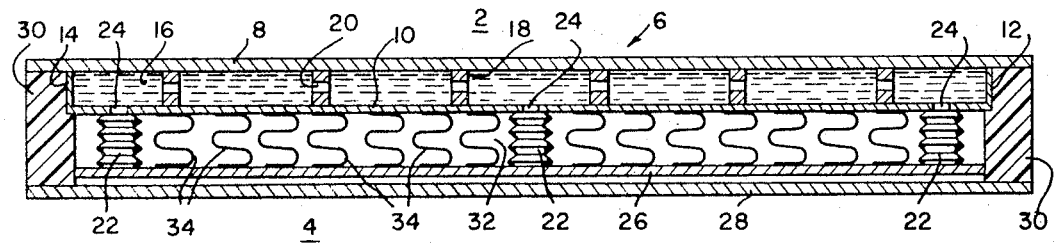
Figure 4:
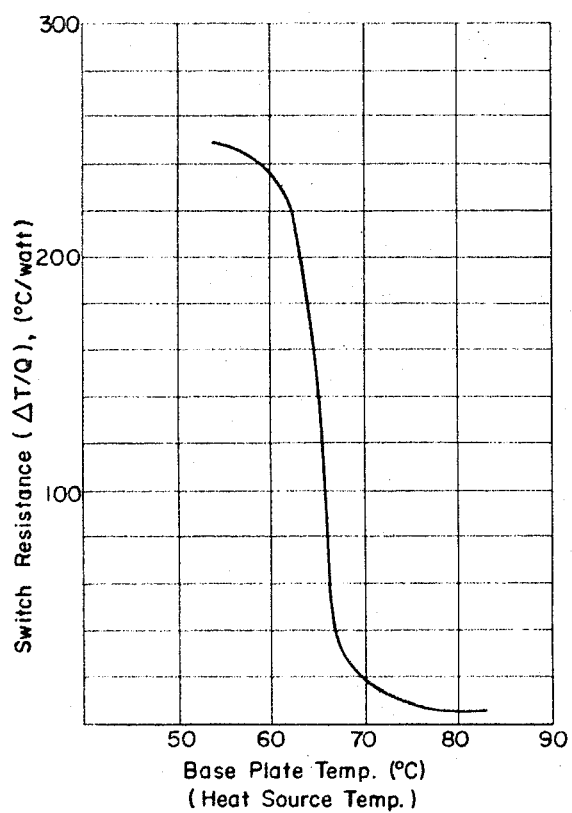
Figure 2:
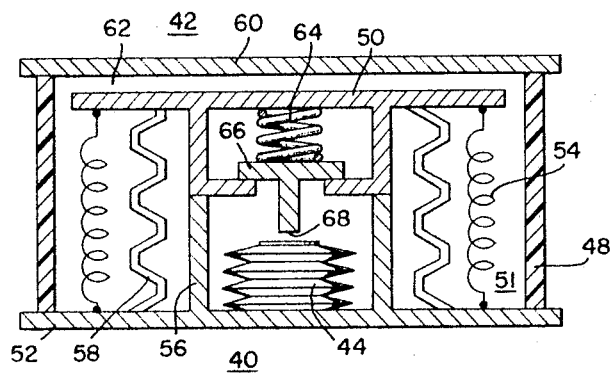
Figure 3:
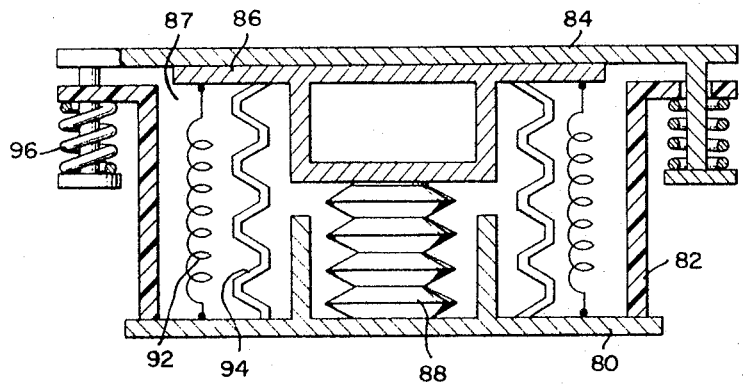

The objects and advantages of this invention will become apparent as this description proceeds taken in conjunction with the drawings in which:

FIGURE 1 is a view partially in cross-section of one embodiment of this invention, FIGURE 2 is a view partially in cross-section of another embodiment of this invention, FIGURE 3 is a view partially in cross-section of still another embodiment of this invention, and FIGURE 4 is a plot of heat source temperature versus thermal resistance of the switch.

Referring now to FIGURE 1, one embodiment of this invention is shown. A source of heat is indicated generally at 2 and a heat sink which may comprise outer space is indicated generally at 4. Although not shown, it is to be understood that for purposes of clarity, heat is not transferred from 2 to 4 except by means of the heat transfer switch 6.

A plate 8 is provided which forms with wall 10 and end walls 12 and 14 a container containing fluid 16. Spacers 18 are provided which contain apertures 20 to allow passage of fluid therethrough. The spacers are also good heat conductors. A plurality of bellows 22 receive fluid from the container through apertures 24. These bellows are expandable. Fluid 16 is selected such that when heated it will expand. When fluid 16 expands, bellows 22 will elongate. In this connection, fluid 16 need not be a good conductor of heat therethrough but preferably acts primarily as the actuator. Attached to bellows 22 is a heat transfer plate 26. Another plate 28 is provided which is spaced from wall 8 by means of an insulated wall 30. Between wall 30, which may be for example circular, is a space 32 which is preferably a vacuum so as to prevent heat transfer by convection from wall 8 to wall 28 when plate 26 is spaced from plate 28. Between plate 10 and plate 26 are a plurality of heat conducting flexible straps 34. These straps also act as a spring which provides a tension load on the bellows 22. While a vacuum is described as being present in all embodiments, it is not necessary but is preferable.

When the temperature of heat source 2 is at or below the desired level, plate 26 is spaced from plate 28 and since there is a vacuum (or ambient) in space 32, only a nominal amount of heat will pass from source 2 to heat sink 4. Since wall 30 is insulated, only a small amount of heat is transferred by radiation and conduction therethrough. When the temperature of heat source 2 rises above the desired level, fluid 16 will expand which will elongate bellows 22 forcing plate 26 into physical contact with plate 28. Heat will then be passed by conduction from heat source 2 through spacer 18, heat conduction straps 34, and plate 26 and plate 28 to heat sink 4. When the temperature of heat source 2 falls to the desired level, plates 26 and 28 will be separated due to contraction of bellows 2, thus breaking the heat conduction path.

FIGURE 2 illustrates still another embodiment. The embodiment of FIGURE 2 is similar to that of FIGURE 1 and includes a heat source 40 and a heat sink 42. A fluid container 44 is provided which comprises an expandable bellows containing fluid. Insulated walls, which may be a single annular wall is shown at 48 and preferably encloses a space 51 which is evacuated. A heat transfer element is shown at 50 which is biased toward heat source wall 52 by means of springs 54 so as to rest on walls 56. Between element 50 and heat source wall 52 are flexible heat conducting straps 58 to provide a heat transfer medium between heat source wall 52 and heat transfer element 50. Normally spaced from element 50 is heat sink wall 60. Thus, a gap 62 is formed. An overload spring 64 is provided between a support 66 and element 50.

In operation, when temperature of source 40 exceeds the desired level, fluid 46 will expand causing bellows 44 to elongate and contact surface 68 of support 66 tending to force it upward. Spring 64 overcomes the bias of springs 54 thus forcing heat transfer element 50 into contact with heat sink wall 60. This provides heat conduction path from heat source wall 52 through heat conducting straps 58, heat transfer element 50, heat sink wall 60 into heat sink 42. Overload spring 64 is provided so that any overexpansion of the fluid will not harm the apparatus, since excessive elongation of bellows 44 will be absorbed by spring 64. As in the case of FIGURE 1, when the temperature falls in heat source 40, bellows 44 will contract, resulting in separation between element 50 and heat sink wall 60.

Another embodiment is utilized in FIGURE 3 which is similar in many respects to that of FIGURE 2. Thus, a heat source wall 80 forms with insulated wall 82 and heat sink wall 84 a fluid tight space 87 which is preferably evacuated. In this connection, it is noted that the ambient conditions such as space will create the vacuum. A heat transfer element 86 is shown in contact with heat sink wall 84. Expandable bellows 88 containing an expandable fluid forces element 90 against heat sink wall 84 against the bias of springs 92. Heat is therefore transferred from heat source wall 80, through flexible heat conducting straps 94 through heat transfer element 86 to wall 84.

Should expansion to the fluid prove excessive, override springs 96 are provided to absorb the excessive expansion.

FIGURE 4 is a graph of thermal switch resistance plotted against the heat source temperature. It can be seen that a very nominal range of temperature of the heat source provides a large change in switch resistance. Thus, at lower temperatures little heat is transferred through the switch while at a higher temperatures a great deal of heat can be transferred due to the greatly lowered thermal resistance.

The advantages of this invention resides in the ability of the thermal switch to change from an insulator to a conductor over a very small temperature change, thus insuring that the heat source is maintained at a temperature which is relatively constant. The advantages over the bimetallic type heat switch is that there is little or no oscillation. In addition, it is not necessary that the fluid itself be a good conductor of heat in that the heat transfer is accomplished through separate conducting straps. It is noted further that the heat sink temperature has little affect on the heat source temperature.

Having described this invention, it is to be understood that it is limited only by the scope of the claims appended hereto.

What is claimed is:
1. A heat switch for transferring heat between a heat source and a heat sink which comprises:
   an expandable fluid container located in a direct conductive heat transfer relationship with said heat source, said container containing fluid adapted to expand said container when said fluid is heated,
   heat transfer means associated with said expandable fluid container and in heat transfer contact with said heat source, said heat transfer means being adapted to be forced into contact with said heat sink by said expandable fluid container within a narrow predetermined temperature range whereby to transmit heat from said heat source to said sink, and
   biased overload means between said heat transfer means and said heat sink whereby to prevent excessive force between said heat transfer means and said heat sink when heat is being conducted there between.
2. A heat switch according to claim 1 wherein said heat transfer means include at least one flexible heat conducting strap.
3. A heat switch according to claim 1 wherein said heat switch is located in an evacuated environment whereby to prevent heat from being transferred between said heat source and said heat sink.

References Cited

UNITED STATES PATENTS

| | | | |
|---|---|---|---|
| 3,112,878 | 12/1963 | Snelling | 165—32 X |
| 3,167,159 | 1/1965 | Bovenkerk | 165—96 X |
| 3,177,933 | 4/1965 | Webb | 165—96 |
| 3,225,820 | 12/1965 | Riordan | 165—32 X |
| 3,229,755 | 1/1966 | Komarow | 165—32 |
| 3,244,224 | 4/1966 | Hnilicka | 165—32 |
| 3,372,737 | 3/1968 | Schnell | 165—32 |

ROBERT A. O'LEARY, Primary Examiner

ALBERT W. DAVIS, Assistant Examiner

U.S. Cl. X.R.

165—96, 185